United States Patent [19]

Saitoh et al.

[11] Patent Number: 4,678,883
[45] Date of Patent: Jul. 7, 1987

[54] ELECTROMAGNETIC-INDUCTION HEATER WITH MAGNETIC FIELD CONTROL

[75] Inventors: Hajime Saitoh; Morio Maeda, both of Niihama, Japan

[73] Assignee: Sumitomo Heavy Industries, Ltd., Tokyo, Japan

[21] Appl. No.: 872,573

[22] Filed: Jun. 10, 1986

[30] Foreign Application Priority Data

Aug. 9, 1985 [JP] Japan .................. 60-174256

[51] Int. Cl.[4] ............................. H05B 6/40
[52] U.S. Cl. .................. 219/10.61 R; 219/10.43;
219/10.71; 219/10.79
[58] Field of Search ............. 219/10.61 R, 10.43,
219/10.71, 10.75, 10.49 R, 10.79

[56] References Cited

U.S. PATENT DOCUMENTS

| | | | |
|---|---|---|---|
| 2,448,008 | 8/1948 | Baker | 219/10.61 R |
| 2,448,012 | 8/1948 | Baker | 219/10.61 R |
| 3,444,346 | 5/1969 | Russell et al. | 219/10.61 R |
| 4,357,512 | 11/1982 | Nishimoto et al. | 219/10.61 R X |

FOREIGN PATENT DOCUMENTS

| | | |
|---|---|---|
| 59-205183 | 11/1984 | Japan . |
| 84-179375 | 3/1986 | Japan . |
| 61-58190 | 3/1986 | Japan . |
| 1456973 | 12/1976 | United Kingdom . |
| 1546367 | 5/1979 | United Kingdom . |

*Primary Examiner*—Philip H. Leung
*Attorney, Agent, or Firm*—Armstrong, Nikaido, Marmelstein & Kubovcik

[57] ABSTRACT

An electromagnetic-induction heater having electromagnets which are disposed on both sides of a strip and in face-to-face relationship with each other is disclosed. The electromagnetic-induction heater is arranged to heat by the use of electromagnetic induction the strip which is transferred in a predetermined direction. The electromagnets are respectively constituted by a plurality of magnetic-pole segments which are disposed in a split manner transverse to the direction of travel of the strip and which are capable of individually moving toward the strip, and common coils which surround the magnetic-pole segments. The electromagnetic-induction heater comprises a nonmagnetic-metal movable shielding plate which is disposed at each end portion of each magnet which is near the strip. The shielding plate is moved forward and backward parallel to and transversely relative to the length of the strip, thereby reducing a fringing field generated by each of the magnetic-pole segments.

4 Claims, 10 Drawing Figures

ELECTROMAGNETIC-INDUCTION HEATER WITH MAGNETIC FIELD CONTROL

BACKGROUND OF THE INVENTION

1. Field of the Invention

The present invention relates to an electromagnetic-induction heater which is adapted to heat a continuous thin sheet due to electromagnetic induction.

2. Description of the Prior Art

This type of electromagnetic induction heater is generally arranged to heat a thin sheet having a thickness smaller than its breadth such as a strip (hereinafter referred to simply as "strip") by the use of electromagnetic induction. This known type of electromagnetic induction heater is equipped with electromagnets which are disposed in a face-to-face relationship with and transversely to the direction of travel of a strip, and the electromagnets are energized by an alternating current. It is desirable that the heater is capable of uniformly heating the strip transversely relative to the length thereof, and in addition, it is suitable that, even if the strip is varied in breadth, uniform heating can be effected on the strip.

To meet the above described demands, proposals have heretofore been made of a heater in which, if the breadth of a strip to be heated is varied, electromagnets can be replaced in correspondence with the breadth of the strip, or alternatively, complicated coils are wound around the poles of electromagnets for the purpose of finely adjusting currents flowing in the coil windings so as to cause uniform temperature distribution all over the breadth.

However, these prior-art heaters have a disadvantage in that they need a complicated structure, and cannot rapidly cope with modification of or variations in the breadth of the strip. Particularly, in cases where electromagnets are to be replaced or temperature distribution becomes nonuniform due to changes in external conditions occurring during operation, the prior-art heaters also involve a disadvantage in that the readjustment of electromagnets cannot be easily and quickly performed.

To solve such disadvantages, a heater is known in which each electromagnet is constituted by a plurality of magnetic-pole segments which are disposed in a series which is transverse relative to the length of the strip and can be individually moved toward the strip and a common coil surrounding the segments. This type of the electromagnetic induction heater is disclosed in U.S. Patent Specification No. 3,444,346. The heater is capable of rapidly coping with the occurrence of nonuniformity in temperature distribution by individually adjusting the gap between the plurality of magnetic-pole segments and the strip. However, even this type of heater cannot reduce the fluctuation in temperature distribution to less than 10 percent near the edges of the strip. To improve this situation, the specification of Japanes Patent Unexamined Publication No. 205183/1984 proposes another heater which is arranged to accurately obtain the distribution of a magnetic field, which is required in theoretical terms, by providing plate-shaped side magnetic-pole elements made of a magnetic material in contact with a yoke of the above constructed electromagnets which are located near the breadthwise ends of the strip. The side magnetic-pole elements are provided to guide excessive flux extending out of the breadthwise ends of the strip and prevent it from affecting the strip. As the result, deterioration of power efficiency due to relatively high inductance of coils takes place.

SUMMARY OF THE INVENTION

Therefore, it is an object of the present invention to provide an electromagnetic induction heater in which the deterioration of power efficiency due to the above-described side magnetic-pole elements can be reduced.

It is another object of the present invention to provide an electromagnetic-induction heater which is capable of quickly and easily coping with a wide range of variations in the material, breadth or thickness of the strip.

To these ends, the present invention provides an electromagnetic-induction heater which has electromagnets which are disposed on both sides of a strip and in face-to-face relationship with each other so that they can heat by the use of electromagnetic induction the strip which is transferred in a predetermined direction. The electromagnets are respectively constituted by a plurality of magnetic-pole segments which are disposed in a split manner transverse to the direction of travel of the strip, and which are capable of individually moving toward the strip, and common coils which surround the magnetic-pole segments. The electromagnetic-induction heater comprises a nonmagnetic-metal movable shielding plate which is disposed near at least one end portion of each of the electromagnets which is near the strip, the shielding plate being movable forward and backward parallel to and transversely relative to the length of the strip, so as to reduce a fringing field generated by each of the magnetic-pole segments.

In another aspect, the electromagnetic-induction heater comprises a reversible magnet gap adjustment mechanism which couples the electromagnets disposed on both sides so as to enable the electromagnets to move toward and away from the strip.

The above and other objects, features and advantages of the present invention will become apparent from the following description of the preferred embodiments thereof, taken in conjunction with the accompanying drawings.

DESCRIPTION OF THE PREFERRED EMBODIMENTS

One embodiment of the present invention will be described below with reference to the accompanying drawings.

Figure 1:
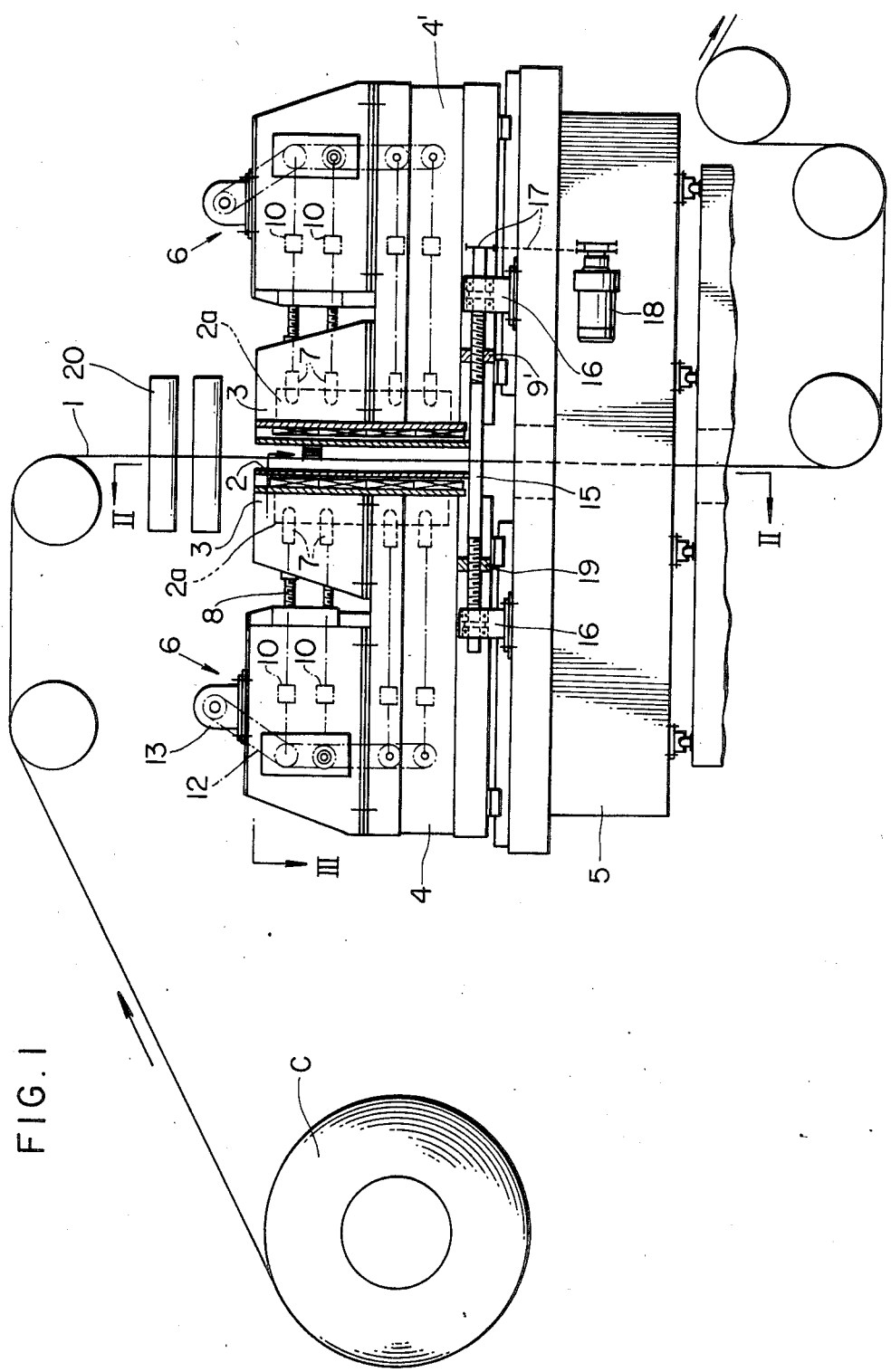
FIG. 1 is a schematic side view of a strip processing apparatus which is provided with one preferred embodiment of the electromagnetic-induction heater of the present invention.
Figure 2:
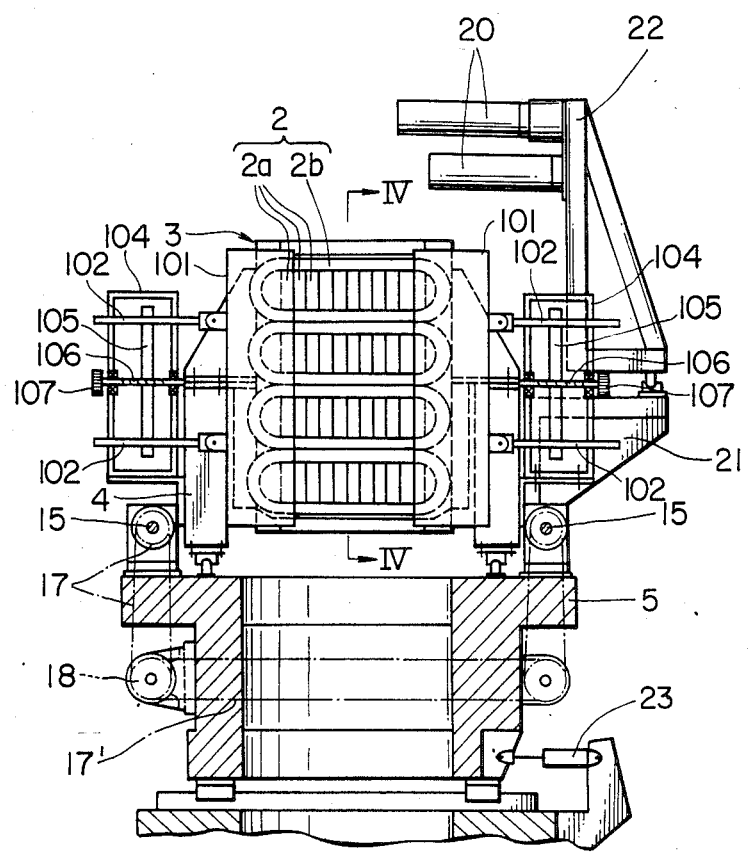
FIG. 2 is a schematic, front cross-sectional view taken along the line II—II of FIG. 1.

FIG. 1 schematically shows a strip processing apparatus which is provided with one embodiment of the electromagnetic-induction heater in accordance with the present invention, and FIG. 2 is a schematic, front view taken along the line II—II of FIG. 1. In this strip processing apparatus, a strip 1 having a thickness smaller than its breadth, which is a thin plate to be heated, is guided by guide rollers and transferred in the direction of the arrows, that is, longitudinally in a continuous manner. At a point midway along the transfer path, electromagnets 2 which together constitute the electromagnetic-induction heater are disposed in face-to-face relationship with each other on both sides of the strip 1. The respective electromagnets 2 facing each other, as shown in FIGS. 2 through 5, are constituted by a plurality of comb-like magnetic-pole segments 2a which are disposed in a series transverse to the direction of travel of the strip 1 and are movably accommodated in a magnetic-pole holding frame 3 which is disposed in a face-to-face relationship with the strip 1 and a plurality of coils 2b disposed such as to individually surround each group of the portions of the magnetic-pole segments 2a which project toward the strip 1 and are fitted on the end portion of each magnetic holding frame 3 which projects toward the strip 1, with an insulating material interposed therebetween. A pair of the electromagnets 2 and a pair of drive mechanisms 6 which allow each magnetic-pole segment 2a to individually move toward the strip 1 (independently of the other magnetic-pole segments) are mounted on moving bases 4 and 4', respectively, and the moving bases 4 and 4' are disposed so as to be capable of moving toward and away from each other over a moving frame 5 which is moved transversely to the direction of travel of the strip 1 in correspondence with variations in the breadth of the strip 1 which is continuously transferred.

Figure 3:
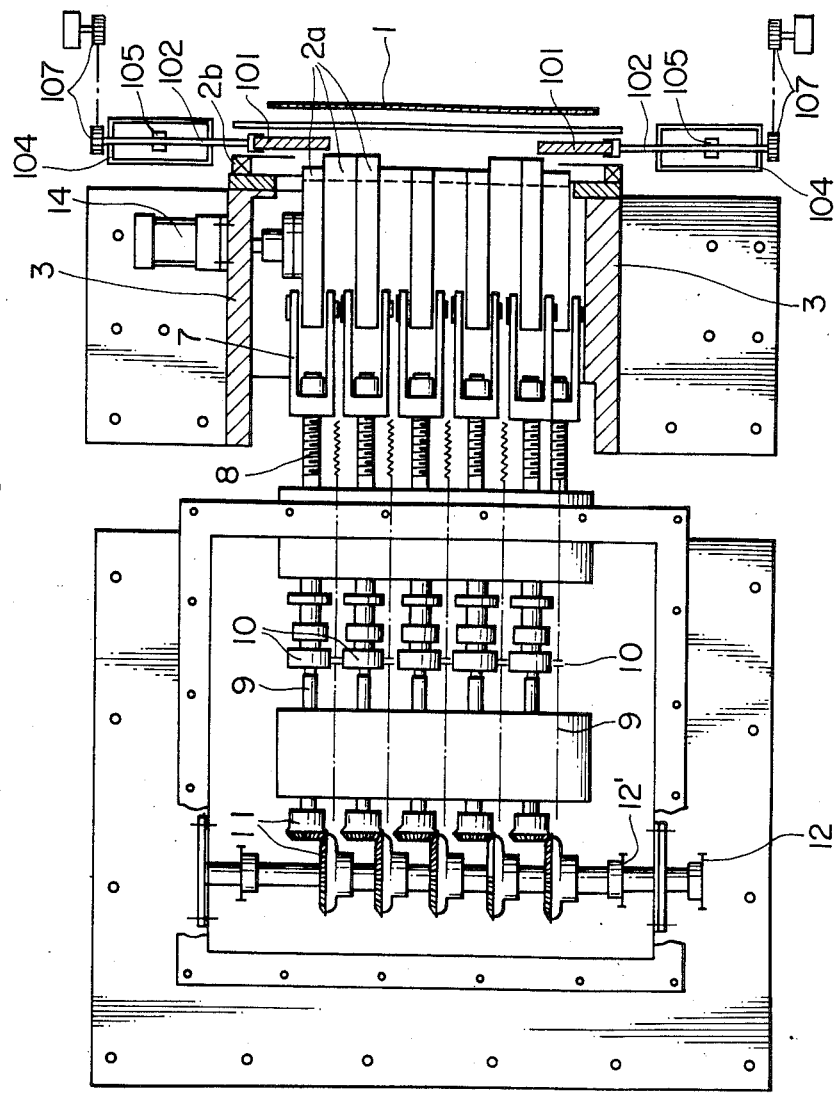
FIG. 3 is a schematic, plan cross-sectional view taken along the line III—III of FIG. 1.
Figure 4:
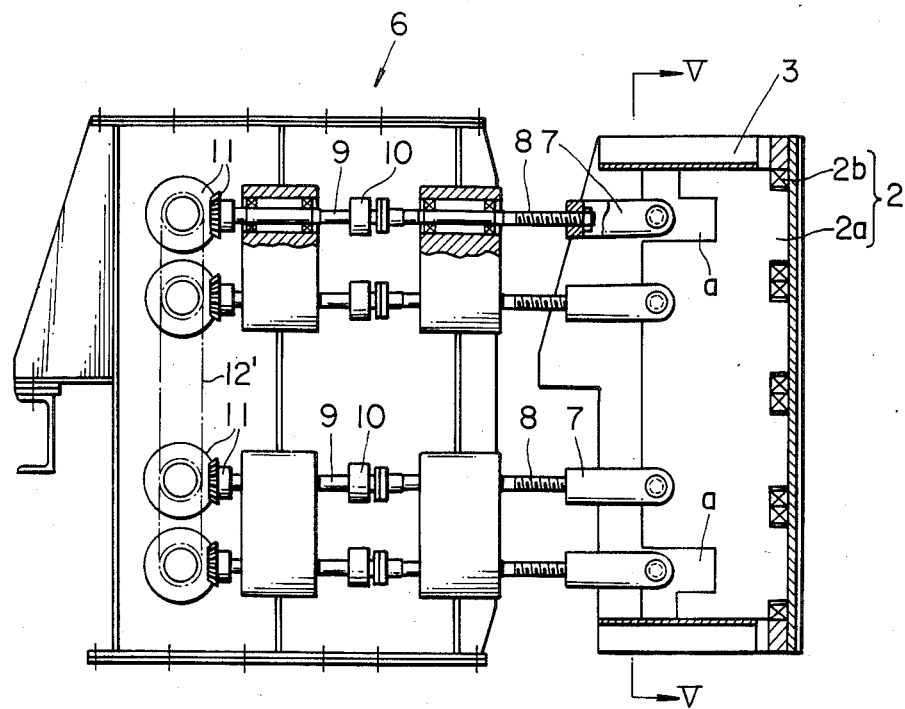
FIG. 4 is a cross-sectional view taken along the line IV—IV of FIG. 2.
Figure 5:
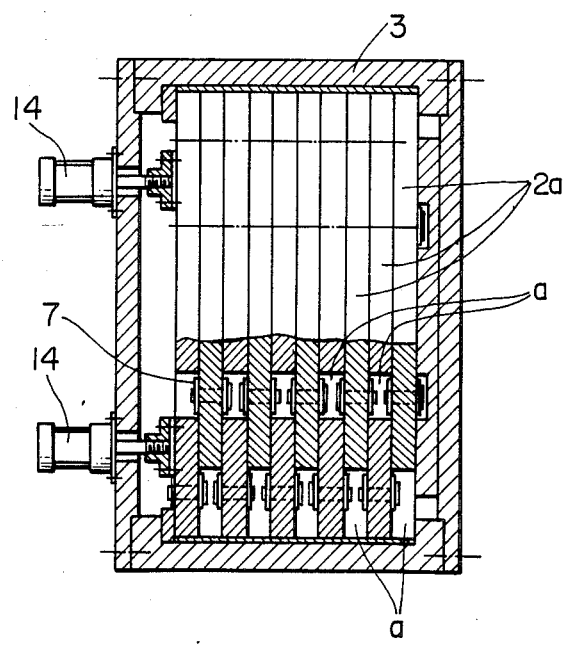
FIG. 5 is a cross-sectional view taken along the line V—V of FIG. 4.

Clevises 7 are secured by pins to each two portions of the upper and lower portions of each magnetic-pole segment 2a and each clevis 7 is screwed onto a screw rod 8 as shown in FIG. 3. Each of the screw rods 8 is individually brought into or out of engagement with a rotary rod 9 through an electromagnetic clutch 10. Each rotary rod 9 is interlocked with a motor 13 through a bevel-gear transmission mechanism 11 and chain transmission mechanisms 12 and 12'. As shown in FIGS. 4 and 5, the clevises 7 which interconnect the magnetic-pole segments 2a and the screw rods 8 are secured by pins in such a manner that each clevis 7 is alternately displaced relative to two adjacent clevises 7. The magnetic-pole segments 2a located on both sides of each clevis 7 have cutouts a so as to prevent each clevis 7 from interfering with two adjacent magnetic-pole segments 2a.

It is to be noted that the sliding operation of each magnetic-pole segment 2a can be further easily performed if a rotational-speed sensor (not shown) is interlockingly mounted on each screw rod 8. The magnetic-pole holding frames 3 have cylinders 14 on their side surfaces for pressedly securing the magnetic-pole segments 2a.

Near both ends of electromagnets 2 are provided shielding plates 101 made of a non-magnetic material. Two parallel rods 102 are connected to the rear edge of each shielding plate 101 and extend into a frame box 104 to be movably supported therein. In the frame box the two rods 102 are interconnected through a connecting rod 105 extending vertically. The connecting rod 105 is engaged in its middle part with a screw 106 which is rotated by screw driving means 107 so that the two rods 102 are moved through the connecting rod 105 to change the displacement of the shielding plate 101. In order to adjust the gap between the electromagnets 2, both moving bases 4 and 4' are respectively connected by nuts 19 and 19' to both end portions of connecting rods 15 which are externally threaded in opposite directions. The connecting rods 15 are disposed on the moving frame 5 so as to be allowed to be only rotated. The two connecting rods 15 are rotated by the motor 18 through chain transmissions 17 and 17' and are braked by a brake incorporated into the motor 18.

A sensor 20 is mounted on a movable frame 22 installed on a frame 21, and while the strip 1 is being transferred, even if the strip 1 moves in a serpentine manner, a drive device 23 interlocked with the sensor 20 is actuated so as to move in a predetermined direction the movable frame 5 on which the entire heater is mounted for the purpose of uniformly maintaining the positional relationship between the electromagnetic-induction heater and the breadthwise direction of the strip 1.

The electromagnetic-induction heater constituting one embodiment of this invention is constructed as described above, and the operation of the embodiment will be described below.

Figure 6:
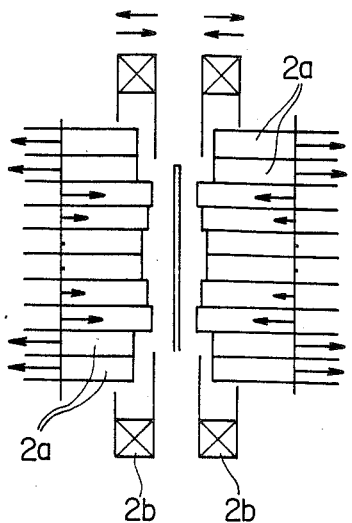
FIG. 6 is an illustration for explaining the operation of the embodiment shown in FIGS. 1 through 5.

At first magnetic-pole segments should be turned in the proper location depending on the breadth and the material characteristics of the strip. To this end, each magnetic-pole segment 2a in the magnetic-pole holding frames 3 is unclamped by the operation of the cylinders 14. While all the rotary rods 9 are being turned by the rotation of each motor 13, the electromagnetic clutches 10 are individually engaged, whereby desired ones of the magnetic-pole segments 2a are slid. Specifically, the magnetic-pole segments 2a which are positioned at both breadthwise end portions of the strip 1, are moved toward and away from strip as shown in FIG. 6.

In this state, when each coil 2b is energized, the distribution of magnetic flux density is varied transversely relative to the direction of travel of the strip 1 due to differences in the gap between each pair of magnetic-pole segments facing each other. In order to avoid overheating of the breadthwise end portions of the strip, it is required to weaken the magnetic field in the breadthwise end portions of the strip.

The electromagnetic-induction heater which constitutes this embodiment of the present invention has a plate-shaped moving shielding plate 101 made of a non-magnetic material having a good electrical conductivity. The moving shielding plate 101 is driven by a shielding-plate drive mechanism 105, 106, 107, and is guided transversely relative to the direction of travel of the strip 1 through the shielding-plate supporting guide mechanisms 102. The moving shielding plate 101 is adapted to shield the strip 1 which is passing near the segments 2a from the magnetic field generated by the segments 2a which are pulled out of the coil 2b in the direction away from the strip 1 and are located in the stand-by position.

The use of the shielding plate 101 made of a non-magnetic material abruptly decreases the magnetic field generated at the both breadthwise ends of the strip 1 and prevents a localized heat from being generated at the same breadthwise ends thereof, so that the uniform distribution of heat temperature can be achieved and the generated magnetic field can be effectively utilized.

If the breadth of the strip 1 is varied, the breadthwise adjustment of magnetic flux density is enabled by the operation described above.

Figure 7:
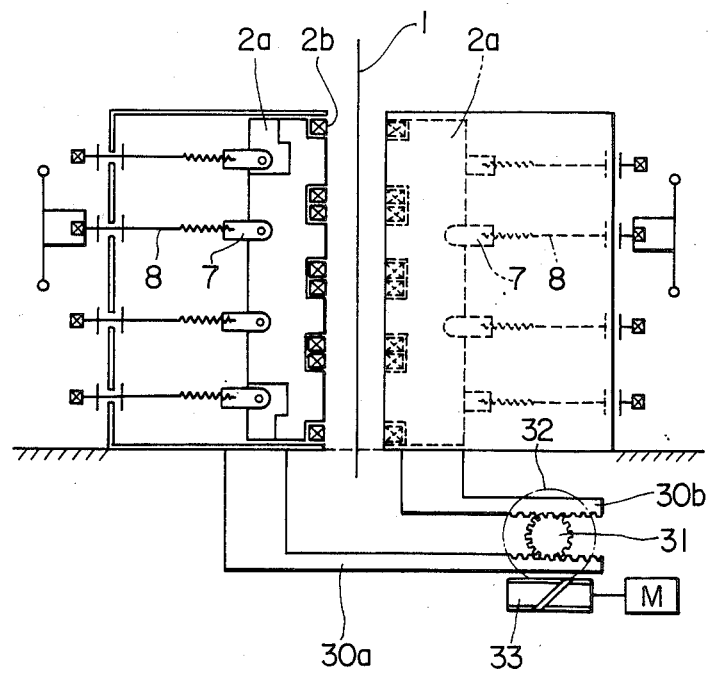
FIG. 7 is a schematic side view of one modification of the embodiment shown in FIGS. 1 through 6.

In the above described embodiment, while the connecting rods 15, which at their both ends are externally threaded in opposite directions, are employed as a reversible adjustment mechanism for connecting both electromagnets 2 to adjust the gap between electromagnets 2, a given construction such as a rack and pinion mechanism or a link mechanism shown in FIG. 7 can be adopted. Also, while each magnetic-pole segment 2a is slidably operated by motor power through the engagement and disengagement of the electromagnetic clutches, each screw rod 8 may be arranged to be directly rotated by hand as shown in FIG. 7.

In the above-mentioned embodiment, each electromagnet is constituted by a plurality of electromagnetic-pole segments having the same thickness. However, when a variable range of the strip breadth can be anticipated, the thicknesses of magnetic-pole segments which are positioned in the center between both breadthwise ends of the strip may also be made larger than those of magnetic-pole segments which are positioned at both breadthwise end portions of the strip.

In accordance with the present invention, in a position into which the shielding plate 101 should be inserted, each magnetic-pole segment 2a is pulled out of the coil 2b and is placed in a weak magnetic field, so that the above-described unwanted heat of the shielding plate 101 is reduced, thereby preventing the deterioration of power efficiency.

In order to reduce the above-mentioned unwanted heat as low as possible, the shielding plate 101 is suitably constituted by a material having a good electric conductivity and a thickness as thick as possible.

As will be readily understood for those skilled in the art, in accordance with the present invention, the electromagnetic-induction heater can be achieved in which each segment is individually movable toward the strip and the position of the shielding plate is adjusted so that the distribution of a magnetic field generated transversely relative to the length of the strip can be freely adjusted and power efficiency is not lowered.

Figure 8:
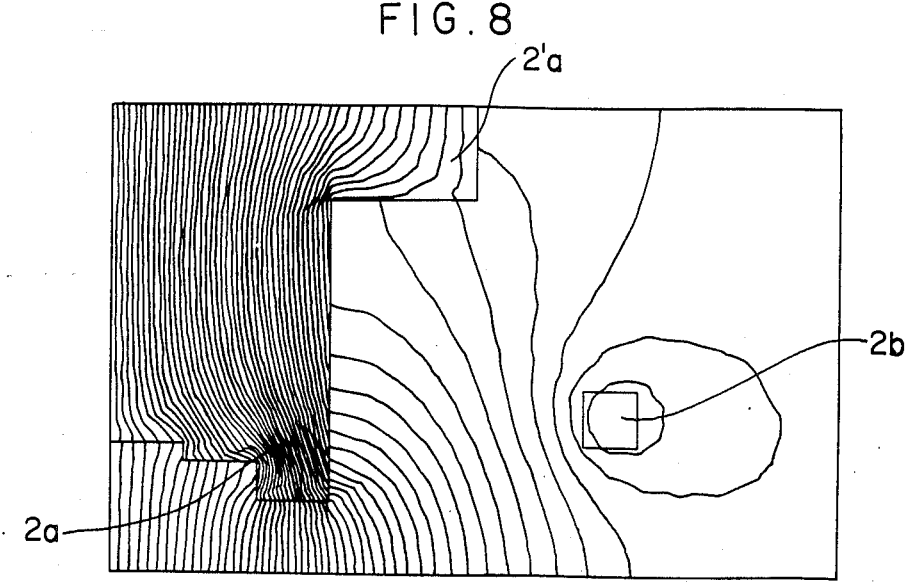
FIGS. 8, 9 and 10 are typical views of distribution of lines of magnetic force in the case where no shielding plate nor side magnetic pole is provided, in the case where a side magnetic pole is provided, and in the case where a shielding plate made of a non-magnetic material according to the present invention is inserted, respectively.
Figure 9:
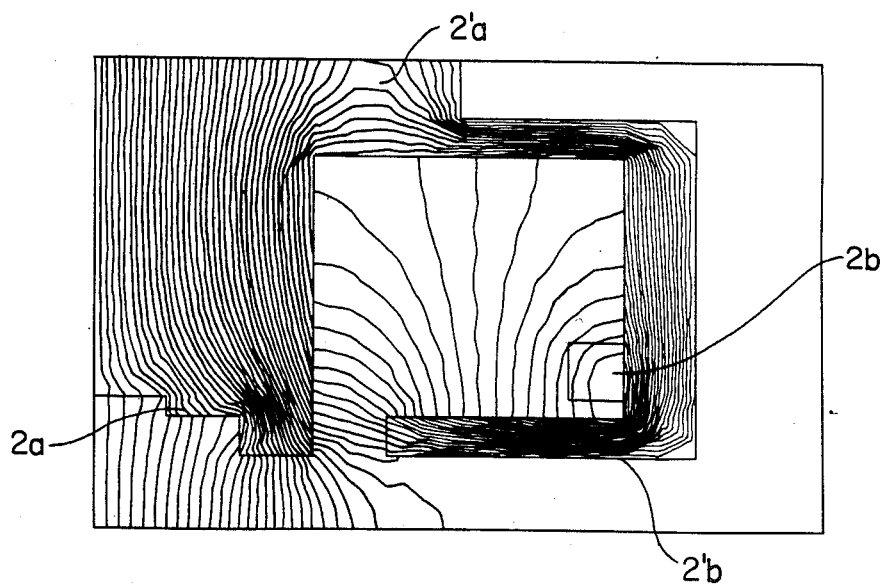
Figure 10:
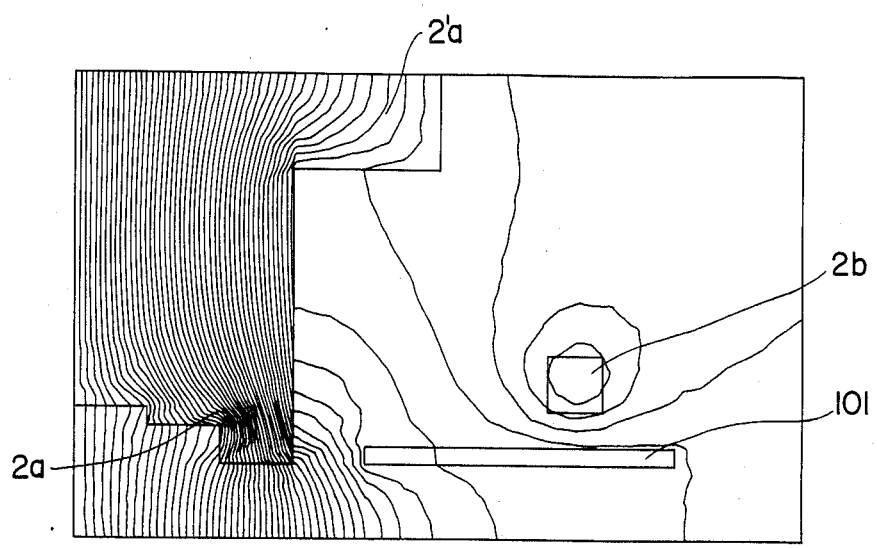

There has been an example in which side magnetic poles made of a magnetic material are used to control the fringing field. Distribution of lines of magnetic flux in various cases which have been determined through theoretical calculation are shown in FIGS. 8 to 10 which are typical views of the portion corresponding to that shown in right upper half of FIG. 3. FIG. 8 shows the distribution in the case where no shielding plate nor side magnetic pole is provided, FIG. 9 shows the distribution in the case where a side magnetic pole 2′b is provided, and FIG. 10 shows the distribution in the case of the present invention where a shielding plate 101 made of a non-magnetic material is inserted. In these drawings, the reference numeral 2′a denotes magnetic-pole segments at the breadthwise end of the electromagnet which are pulled out of the coil 2b. FIG. 8 illustrates that a considerable number of lines of magnetic flux exist in the space from which segments are pulled away and thus this space is under the action of a large fringing field. On the other hand, from FIGS. 9 and 10 it will clearly be seen that the fringing field is very weakened.

Comparing FIG. 9 with FIG. 10, the number of lines of magnetic flux as shown in FIG. 9 is overwhelmingly larger than that shown in FIG. 10. For this reason, under the same condition, the inductance of the coil in FIG. 10 is one half to one third of that in FIG. 9. As a result, the amount of consumption of electric power for conducting the same heating is extremely different between the both cases.

Furthermore, in the case of any strip having a breadth within the maximum one which can be processed by the heater, even if the breadth of the strip is varied, a desired magnetic-field distribution can be achieved without any modification of the heater itself. In this case, no special and complicated auxiliary winding is needed. For example, if it is necessary to uniformly heat the strip breadthwise, each segment and the shielding plate are shifted in correspondence with the distribution of a magnetic field required for uniform heating. Moreover, if nonuniformity occurs in the temperature distribution due to variations in external circumstances during the operation, a proper correction can be quickly performed by readjusting the shielding plate and the corresponding segments at the time of the occurrence of the variations. The present invention, of course, enables the nonuniform distribution of temperature, too.

The present invention has also the structure and the function described above in detail, this electromagnetic-induction heater can be easily adapted to several kinds of strips which differ in material, breadth and thickness, and a uniform adjustment of heating can be quickly achieved transversly to the direction of travel of the strip. In addition, the combination of the adjustment of the gap between each pair of magnetic-pole segments facing each other and that between both electromagnets facing each other by using the reversible adjustment mechanism is capable of enlarging a variable range of the distribution of a magnetic flux transverse to the direction of travel of the strip. Accordingly, the above described embodiment of the present invention has great advantage in that if the material, breadth and thickness of a strip to be heated are varied, breadthwise heating can be uniformly effected in correspondence with each strip so that the optimum distribution of a magnetic flux can be achieved.

The combination of the plurality of magnetic-pole segments 2a individually movable toward the strip 1 and the shielding plate 101 made of a non-magnetic material is by all means required for the electromagnetic-induction heater which needs a good efficiency of electric power and a good uniformity of heat temperature. Specifically, in a case where the shielding plate 101 is absent, even if each segment 2a is pulled out of the coil 2b, a considerable magnitude of a magnetic field remains at the end portions of the strip 1. The end portions are thus locally heated so that the irregularity of temperature distribution takes place. Therefore, the reduction of the residual magnetic field by the shielding plate 101 is effective in the improvement in the distribution of heat temperature.

On the other hand, in the case of using electromagnets which are not split into segments movable toward the strip 1, the shielding plate 101 alone cannot ensure the satisfactory uniformity of heat temperature (for example, within 10%). In addition, since the shielding plate 101 must be inserted into a strong magnetic field, it is heated more than necessary, leading to the deterioration of power efficiency.

Referring to one modification of the abovedescribed preferred embodiment of the present invention, each segment and the sheilding plate may be moved and adjusted by a remote control. It is a matter of course that the shape of the segment is not limited to four legs as shown in cross-section.

Also, while the electromagnet is split into segments over the breadthwise range of the strip, if a variable range of the breadth of the strip is anticipated in an apparatus to which the above embodiment is applied, a portion of the electromagnet may have a fixed structure without any split so as to match with the minimum breadth, thereby providing a variable structure within a variable range of the breadth.

Moreover, the adjustment mechanism based on the division into splits may be applied to one end portion of the electromagnet while the other may have an integrally fixed structure of a predetermined shape.

In this case, one end portion of the strip to be heated is correctly positioned at the fixed structure of the electromagnet, and the other end thereof is placed at the variable structure portion. Owing to the above described mechanism, if the breadth of the strip is varied, heating based on the required temperature distribution can be achieved.

What is claimed is:

1. An electromagnetic-induction heater comprising:
   a strip which is transferred in a predetermined direction;
   electromagnets disposed on both sides of said strip in a face-to-face relationship to heat said strip by electromagnetic induction, said electromagnets including
   a plurality of magnetic-pole segments disposed transverse to the direction of travel of said strip, said plurality of magnetic-pole segments being individually movable toward and away from said strip,
   a plurality of common coils, each common coil surrounding a group of said magnetic-pole segments;
   non-magnetic movable shield plate to reduce a fringing field generated by each of said magnetic-pole segments, said shield plate being disposed adjacent to at least one end portion of each electromagnet near said strip, said shield plate being movable forward and backward parallel to and transversely to the length of said strip; and
   means for moving said non-magnetic movable shield plate, said means for moving said shield plate including
   at least two rods connected near an edge of said shield plate,
   connected rods for interconnecting said at least two rods,
   screw means for interconnecting said connecting rods, and
   screw driving means for driving said screw means so said at least two rods are moved through said connecting rod to change the displacement of said shield plate.

2. An electromagnetic-induction heater according to claim 1, further including a means for moving said magnetic-pole segments.

3. An electromagnetic heater according to claim 1, further including a means for moving said magnetic-pole segments including
   a plurality of attachment means attached to said plurality of magnetic-pole segments,
   a plurality of screw rods attached to said plurality of attachment means,
   a plurality of rotary rods attached to said screw rods, and
   electromagnetic clutch attached to said plurality of rotary rods, said plurality of rotary rods simultaneously rotating at a same speed.

4. An electromagnetic-induction heater according to claim 1, further including a sensor means and a drive device means interlocked with said sensor, said drive device means for moving a movable frame on which said electromagnetic-induction heater is mounted, said movable frame being moved in a predetermined direction to uniformly maintain the positional relationship between said electromagnetic-induction heater and a breathwise direction of said strip.

* * * * *